Sept. 5, 1939.  H. S. DRUM ET AL  2,171,975
METHOD AND APPARATUS FOR TREATING ARTIFICIAL THREAD
Filed Feb. 16, 1937    2 Sheets-Sheet 1
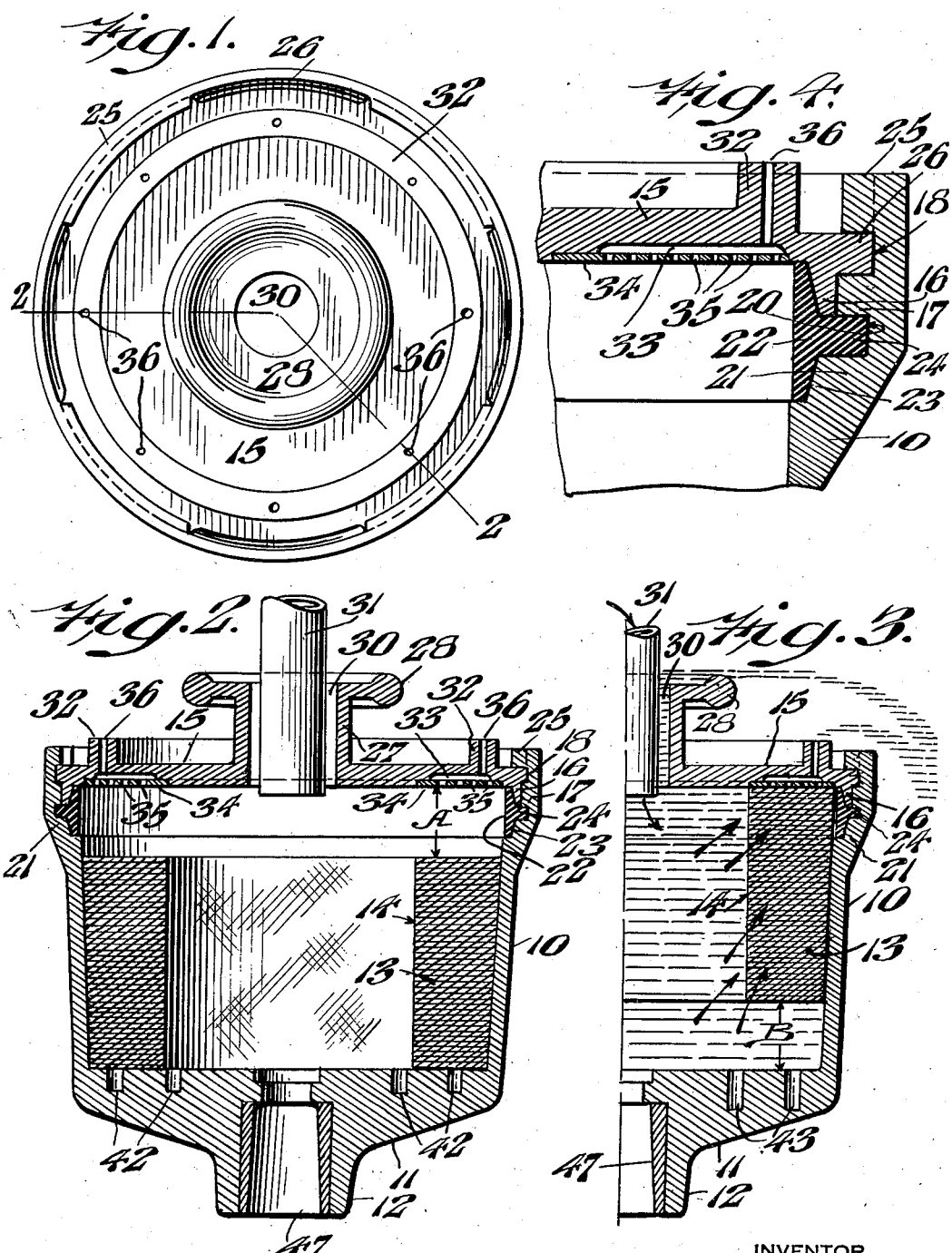
INVENTOR
Harry S. Drum and William C. Dodson
BY
Robert M. Barr
ATTORNEY Sept. 5, 1939.   H. S. DRUM ET AL   2,171,975
METHOD AND APPARATUS FOR TREATING ARTIFICIAL THREAD
Filed Feb. 16, 1937   2 Sheets-Sheet 2
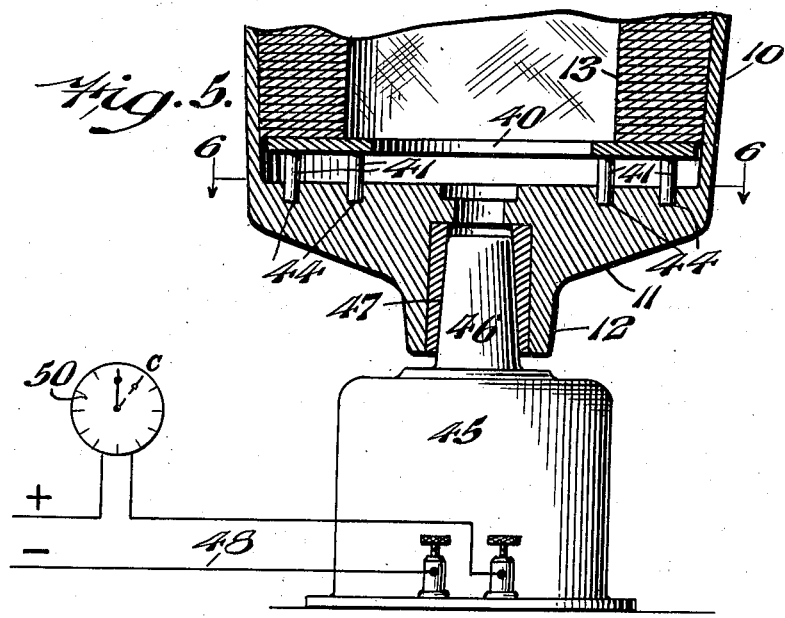
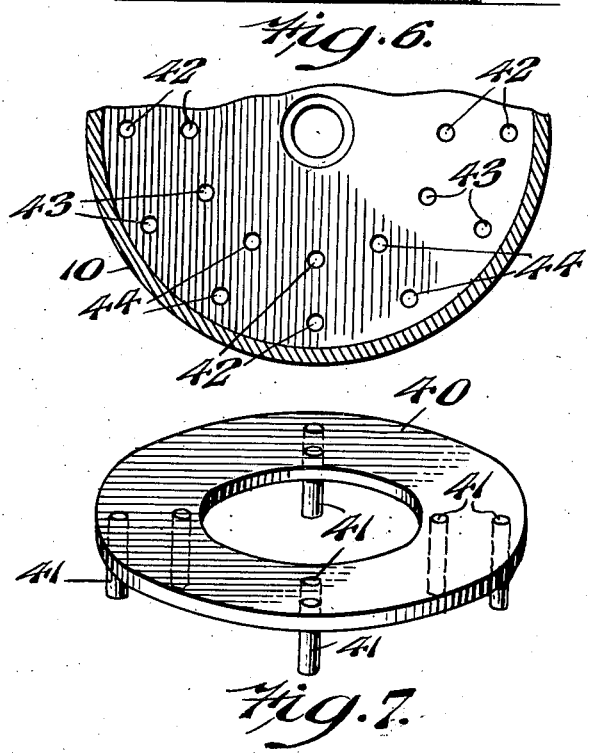
INVENTOR
Harry S. Drum and William C. Dodson,
BY
Robert M. Barr
ATTORNEY Patented Sept. 5, 1939

2,171,975

UNITED STATES PATENT OFFICE 2,171,975

METHOD AND APPARATUS FOR TREATING ARTIFICIAL THREAD

Harry S. Drum and William C. Dodson, Abington, Pa., assignors to Smith, Drum and Company, Philadelphia, Pa., a corporation of Pennsylvania Application February 16, 1937, Serial No. 125,986

3 Claims. (Cl. 18—8)

The present invention relates to an apparatus and method for washing and treating artificial filamentous threads, and more particularly to the washing and treating of rayon in the cake formation which results from the initial spinning operation.

In treating and washing apparatus and processes heretofore in use for treating rayon many objections and disadvantages are present of which may be mentioned the uneven results obtained in some methods, the time delay in other methods, and the restriction of the natural or normal expansion of the cake in still other methods.

Some of the objects of the present invention are to provide an improved apparatus and process for treating artificial threads and rayon cakes; to provide means whereby the time usually required to completely wash and treat rayon cakes is reduced to a minimum and the production increased many fold; to provide a rayon treating process including as a step the complete submergence of the cake while under treatment, causing a circulation of the liquid through the cake in a predetermined direction, and allowing the cake free unrestricted expansion in a direction lengthwise of the cake during treatment; to provide a rayon treating process whereby the cakes come from the treating operation uniform as to texture, color and condition; to provide a treating apparatus for rayon cakes wherein means are provided for efficiently treating cakes which vary as to size; to provide a rayon treating apparatus wherein an automatic indication is made of conditions existing in any treating bucket during a treating operation; to provide a treating apparatus for rayon cakes wherein the power required for operating purposes is maintained at a minimum; and to provide other improvements as will hereinafter appear.

In the accompanying drawings Fig. 1 represents a plan of a rayon cake treating bucket embodying one form of the present invention; Fig. 2 represents a section on line 2—2 of Fig. 1 showing the rayon cake in its initial position in the bucket; Fig. 3 is a detail section like Fig. 2 but showing the position of the cake when the bucket is filled with treating liquid; Fig. 4 represents a sectional detail on an enlarged scale; Fig. 5 represents a side elevation, partly in fragmentary section, showing the bucket and the driving means therefor; Fig. 6 represents a section on line 6—6 of Fig. 5; and Fig. 7 represents a perspective of one form of support for the fiber cake.

Referring to the drawings one form of the present invention consists of a bucket 10 of open top construction and having a bottom 11 provided with an integral coaxial hub 12 which forms a step bearing for assembly with a rotating part whereby the bucket 10 is caused to spin at a predetermined number of revolutions per minute. Thus bucket 10 forms an inverted frusto-conical receptacle corresponding generally to the outer configuration of a rayon cake 13 as it comes from the spin pot in which it is formed. The cake 13 is generally tubular frusto-conical shape and consequently when placed within the bucket 10 its inner face 14 is exposed to the action of the treating liquid, be it desulphuring, bleaching, washing or other treatment. In accordance with the present invention the depth of the cake receiving portion of the bucket 10 is as much greater than the length of the cake as will permit the maximum expansion of any cake during the treating operation. Thus as shown in Fig. 2 with the cake in its initial position there will be a space A between the top of the cake 13 and the cover 15 of the bucket. During treatment, however, the position of the cake 13 shifts to the top of the bucket due to the fact that when the cake becomes submerged the centrifugal force will then lift the cake to close the space A and create the space B at the bottom into which the cake is free to expand axially during the treating step or steps.

For preventing the cake 13 from spinning out of the bucket 10 the cover 15 is provided consisting of a circular plate having a circumferential flange 16 of a diameter such as to fit snugly against the face of an annular rib 17 which is formed between the cover locking grooves 18 and a sealing groove 20 of a circumferential outwardly flared extension 21 of the bucket 10. The inner side of the flange 16 is beveled to conform to the shape of the uper portion of a coacting gasket 22 while the lower portion of this gasket 22 fits in a circumferential seat 23. Intermediate these portions of the gasket 22 is an integral outwardly disposed tongue 24 which extends circumferentially about the gasket, and in assembled condition seats in the sealing groove 20. The gasket 22 is of rubber or some suitable resilient material impervious to the liquids used and when in position acts as a complete leak-proof seal for the joint between the cover 15 and the extension 21. Thus the gasket 22 is of substantially T shape in section so that the arms of the T are free to flex under the outwardly acting pressure with the result that the greater the pressure the tighter the gasket seats over the cover joint.

In order to lock the cover 15 in closed position a bayonet type of joint is provided consisting of a plurality of inwardly disposed spaced segmental lips 25 on the upper rim of the extension 21 between which segmental projections 26 of the cover plate 15 can pass to bring the top plane of the cover below the bottom plane of the lips 25 whereupon a turning movement of the cover brings the projections 26 respectively into register with the lips 25 to thereby prevent displacement of the said cover. By turning the cover 15 from locked position to one where the projections 26 are respectively in register with the spaces between the lips 25 it can be removed and replaced.

For the purpose of supplying treating fluid to the interior of the bucket 10, the cover 15 has a coaxially disposed exteriorly projecting hub 27 terminating in an integral hand wheel 28 by which the cover can be lifted and rotated as required for locking and unlocking. The hub 27 and wheel 28 are tubular to provide an overflow outlet 30 for liquid and this is here also used to receive a pipe 31 carrying the liquid into the bucket 10. Preferably the diameter of the pipe 31 is sufficiently less than the bore of the hub 27 in order not to obstruct the flow of any liquid which may find its way to the outlet 30. An annular upstanding rib 32 is concentrically disposed about the hub 27 and forms an integral part of the cover 15, its function being to direct the discharge of the liquid outwardly in a plane above the plane of the top edge of the bucket. By so doing it prevents this discharge liquid from striking a driven part in which case it would materially increase the resistance to rotation and thereby add to the load on the motor, or other driving means.

As a means to allow the treating liquid to escape after passing through the cake so that the circulation is continuous and at the same time prevent the cake from obstructing such escape, the lower face of the cover 15 is provided with a circumferential channel 33 so located as to register with the top of the cake. Preferably a ring plate 34 is set into the cover 15 flush with the inner face thereof and serves as a partition between the channel 33 and the interior of the bucket. Perforations 35 through the plate permit the liquid to find its way to the channel 33 and thence to the atmosphere by way of ports 36 arranged at suitable intervals in the rib 32. The aforesaid perforated plate 34 prevents the cake from rising to a position where it could close the ports 36.

In carrying out the present method and in operating the apparatus, a rayon cake 13 is placed in the bucket 10 to assume the position shown in Fig. 2. The bucket rotating means, operating through the hub 12, is now started so that the bucket receives the required speed of rotation, at which time the treating liquid enters by way of the pipe 31 to fill the bucket. Thus the cake 13 becomes completely submerged and under the combined influence of the centrifugal force rises to the position shown in Fig. 3 with its top portion abutting the perforated plate 34. In this position, while the cake is still submerged, there is a combined axial and radial flow of liquid whereby the cake receives a uniform treatment under such pressure as will be effective for the purpose intended. Since during treatment the cake is submerged and under uniform pressure throughout its mass there is no opening up of porous areas with the consequent lack of treatment in other areas. In other words the present submerged action results in uniform thread treatment. Circulation is maintained by the liquid passing through ports 35 into the channel 33 and thence to the discharge ports 36. By reason of the space B below the cake all natural or normal expansion of the cake can take place unrestricted, a feature which has not been hitherto appreciated in the treatment of cakes of this character. The beneficial result of such unrestricted expansion has not been known until the present apparatus was invented. It has now been found by allowing unrestricted expansion that the entire body of the cake responds to the expansive action and whatever change of density takes place is uniform in character and not segregated in spots as where such expansion is limited or prevented. It should also be noted that the upward flow of liquid discharges through the ports 36 to the atmosphere where by reason of the elevated outlets it is thrown radially outward above and beyond the rim of the bucket 10.

In view of the fact that different rayon manufacturers produce cakes of varying sizes, particularly as to height, and also due to the fact that in accordance with the present invention it is advisable to maintain the space B at the minimum which will allow only unrestricted normal expansion of the cake, a spacing element is provided in the form of a ring 40 which has a diameter such that it will readily fit within the bottom of the bucket 10 and take a supporting position below the cake 13. In order that this ring 40 may be spaced different distances from the bottom of the bucket 11 it is provided with a series of legs 41 preferably arranged diametrically and of a number such as will support the ring 40 in a horizontal position. These legs 41 are arranged to fit inside sockets 42, 43 and 44 which are drilled in the bottom of the bucket at the same radial distances respectively from the axis of the bucket as are the legs 41 of the ring 40. The sockets 42 while of the same depth are of different depth than either the sockets 43 and 44, and the sockets 43 are of a different depth than the sockets 42 and 44, and the sockets 44 are of a different depth than either the sockets 42 and 43. In this connection it should be noted that the series of sockets 42 are diametrically opposite each other and one series is substantially at right angles to the other series. Likewise the two series of sockets 43 are disposed at right angles to each other, with the sockets 43 of each series diametrically opposite each other. The sockets 44 are similarly arranged as just described. By this arrangement the ring 40 can be placed so that the legs 41 are in register with the sockets 42 and thereupon the ring 40 is positioned to take care of a cake of one certain length. If the ring 40 is turned so that the legs 41 enter the sockets 43 it will be located at a different distance from the bottom of the bucket, and consequently take care of the positioning of a cake of length different from that used with the ring in the sockets 42. Likewise by lifting the ring and turning it to its position where the legs 41 enter the sockets 44, it will then assume a position at still greater distance from the bottom of the bucket and thereby answer the supporting requirements of a third cake of still a different length. It will be understood that as many different series of sockets can be provided as there will be different lengths of cakes in use and by varying the depths of such sockets the required expansion space for the cake will be maintained substantially uniform regardless of the length of the cake. While the present use of a ring support is considered the preferable way of accomplishing this end, it is to be understood that the invention is not to be limited to such a specific construction as various other expedients can probably be substituted without departing from the spirit of the invention. What is believed of importance is that the space B be kept within such limits as will at all times allow unrestricted normal expansion of the cake.

For rotating the bucket to carry out the treating operations an electric motor 45 is provided which is mounted in any suitable manner with its driving shaft 46 vertically disposed to enter a bushing 47 which is fast within the bore of the head 12. The shaft 46 is of tapered construction to conform to the internal tapering of the bushing 47 so that when the latter is placed upon the shaft it will become fast to the shaft for driving purposes. The motor is in an electrical circuit 48 which includes an electric meter 50 such as an ammeter, wattmeter, or other indicating device and under normal efficient running conditions the meter 50 will show its pointer in a position shown in dotted lines at C. Thus when the resistance of the bucket to the applied torque is a minimum, the meter will have its pointer opposite the index C. In case the resistance of the bucket decreases due for example to any cause which would decrease the volume of the circulated treating liquid, such for example as a clogging of one or more of the discharge ports 36, then the pointer of the meter 50 will instantly respond to the decreased power demand and visually indicate by a shifting of the pointer to a new position a condition altered from normal running conditions. The advantage of thus having a tell-tale for each bucket should be readily apparent since a single unit of this character may have some hundred or more buckets running at the same time, and the present apparatus makes it possible to have a direct check upon the condition of the flow through every cake under treatment.

While only a single form is shown in which this invention may be embodied, it is to be understood that the invention is not limited to any specific construction, but might be applied to various forms without departing from the spirit of the invention or the scope of the appended claims.

Having thus described our invention, we claim:

1. An apparatus for treating thread in cake formation comprising an open top bucket arranged to receive a thread cake, said bucket having a depth greater than the length of said cake to provide a space juxtaposed to one end of said cake for allowing unrestricted expansion of said cake under treatment, means to mount said bucket for rotation, a cover for said bucket, means to introduce a treating liquid into said bucket, a gasket, a tongue and groove assembly between said bucket and gasket, a flange on said cover, and an annular part on said gasket arranged to abut said flange under pressure of the treating liquid, whereby a leak-proof joint is obtained between said cover and said bucket.

2. An apparatus for treating thread in cake formation comprising a bucket for receiving a thread cake, the bottom of said bucket having two series of sockets therein, one series being of greater depth than the other series, a plate forming a support for said cake, and legs on said plate to enter said series of sockets, one series at a time, whereby said plate can assume two different positions with respect to said bottom.

3. The method of treating thread in cake formation which consists in confining a cake in a closed receptacle for movement axially thereof, introducing treating liquid into said receptacle to float the cake to a position allowing unrestricted normal expansion of the cake axially, and circulating treating liquid through the cake while floating.

HARRY S. DRUM.
WILLIAM C. DODSON.